Feb. 2, 1965
N. G. BRANIBAR
3,168,402
PHOTOGRAPHIC STRIPPING FILM
Filed April 27, 1961
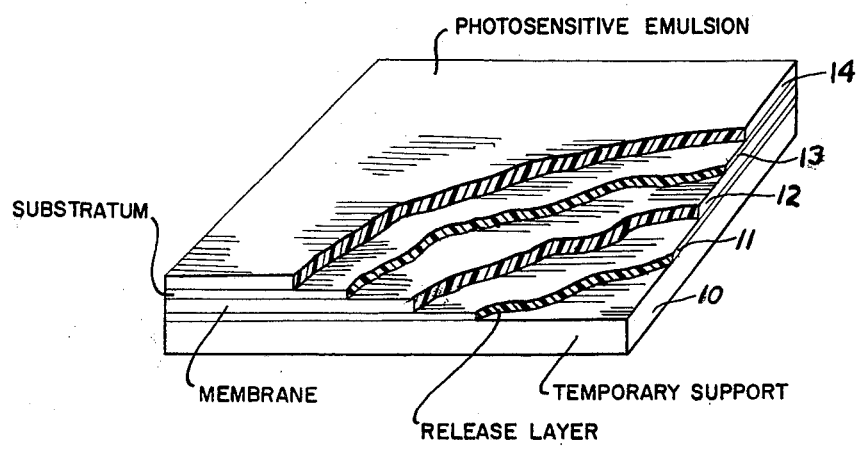
INVENTOR.
NICK G. BRANIBAR
BY Bosworth, Sessions,
Hernstrom & Knowles

United States Patent Office 3,168,402
Patented Feb. 2, 1965

3,168,402
PHOTOGRAPHIC STRIPPING FILM
Nick G. Branibar, Parma, Ohio, assignor, by mesne assignments, to Minnesota Mining and Manufacturing Company, a corporation of Delaware
Filed Apr. 27, 1961, Ser. No. 106,035
5 Claims. (Cl. 96—83)

This invention relates to photographic film and more particularly to photographic stripping film.

A conventional stripping film used in the graphic arts and in particular in photo-engraving and like processes comprises a temporary support which may be composed of any convenient transparent film base material. One side of the temporary support is coated with a release layer upon which a thin membrane is supported. The membrane in turn is provided with a conventional subbing layer and a photo-sensitive emulsion. The relase layer permits the membrane bearing the photosensitive emulsion to be removed from the temporary support after exposure and processing. The release layer must bond the membrane to the temporary support firmly enough to prevent displacement of the membrane during exposure and processing of the film and yet permit the membrane to be removed without too much difficulty. The other side of the temporary support is provided with a substratum on which is coated an anti-halation coating. The provision of the anti-halation layer requires two additional coating steps on the temporary support and adds substantially to the cost of manufacturing the film.

A general object of the present invention is to provide an improved photographic stripping film which can be manufactured at reduced cost as compared to conventional stripping films presently available. Other objects are the provision of an improved release layer for stripping films, the provision of a stripping film requiring fewer steps in the manufacturing process than conventional stripping films; the provision of a stripping film in which the film may be inspected during and after processing by both reflected and transmitted light; the provision of stripping film in which a given emulsion has a greater effective speed than the same emulsion would have in a conventional stripping film, and the provision of a stripping film in which the temporary support may be used as a masking material after the image-bearing membrane has been stripped therefrom.

According to the present invention, the foregoing and other objects of the invention are attained primarily through modification of the temporary support. Instead of employing a clear temporary support with an anti-halation coating on the back thereof, the temporary support of the present invention is composed of an appropriate film base material that is pigmented throughout so that, although it remains translucent, it in itself acts as an anti-halation layer. The invention may be said to comprise a stripping film made up of a temporary support composed of a translucent plastic film base material that is pigmented so that it acts as an anti-halation layer, a release or stripping layer coated on the temporary support, a membrane or permanent support releasably secured to the temporary support by the release layer and a photo-sensitive emulsion carried by the membrane on the side thereof opposite the temporary support.

A preferred form of stripping film made according to the invention is illustrated in the drawing in which the single figure is a diagrammatic view showing the several layers making up the film greatly exaggerated in thickness and with the relative thicknesses of the various layers not necessarily in correct scale.

As shown in the drawing a preferred form of stripping film embodying the invention comprises a temporary support 10, a release of stripping layer 11, a membrane 12 secured to the temporary support by the release layer 11, a substratum 13, and a photo-sensitive emulsion 14. It will be noted that there are no coatings on the side of the temporary support opposite the emulsion.

The temporary support 10 may be composed of any plastic sheet or film material normally used as a film base, such as, for example, a polystyrene film, a vinyl film, a polyester film, a cellulose acetate film or the like. The temporary support 10 preferably has a thickness of about .005″ but the thickness is not critical. Contrary to the usual practice in which the temporary support is composed of a clear film base material, according to the present invention a pigmented plastic material is employed so that the plastic film base material itself acts as an anti-halation backing for the emulsion 14 that is carried by the membrane 12. The film, however, is not opaque but is translucent. Preferably, the temporary support is pigmented so that is transmits about 22% to 24% of the light falling on it, based on a density of about .64 as determined by a photoelectric densitometer. An orange dye or pigment is preferably employed, the dye or pigment preferably being such that the temporary support 10 transmits the spectrum from a wave length of about 6000 A. to 8000 A. A satisfactory material for producing the desired orange color and giving the desired light absorption qualities is cadmium orange. An orange dye pigment of this character is sufficiently absorptive of the light to which normal stripping film emulsions are sensitive that the temporary support acts effectively as an anti-halation layer.

The release or stripping layer 11 is preferably composed of a thin film of a material such as carboxy methyl cellulose or other material which will hold the membrane 12 in place during normal processing of the film, but which will permit the membrane to be removed after the film has been soaked, as in processing, for a few minutes. Preferably, the release layer consists essentially of the residue of a solution of carboxy methyl cellulose in appropriate solvents.

The membrane 12 is a thin film having a thickness of only about .0005″ to .0007″ and is preferably composed of nitrocellulose, a lesser proportion of polyvinyl butyraldehyde and a plasticizer.

The substratum 13 preferably consists of a very thin coating of nitrocellulose and gelatine, although other suitable substrata may be employed if desired. The substratum functions to anchor the emulsion securely to the membrane.

The emulsion 14 may be of any normal gelatino-silver halide emulsion of the type ordinarily used in stripping films. The emulsion should give high contrast and excellent definition, and ordinarily ortho-chromatic emulsions are employed.

A preferred stripping film can be produced by utilizing for the temporary support 10 a translucent pigmented polystyrene film having a thickness of about .005″ and having the color and light transmission qualities noted above. The polystyrene film marketed by Plax Corporation under the name "Lustrex" and containing cadmium orange as orange pigment gives excellent results.

This film base is coated with the following solution to provide the release or stripping layer 11:

| | Parts by weight | |
|---|---|---|
| | Preferred | Range |
| Butyl Cellosolve (ethylene glycol monobutyl ether) | 6 | 2–15 |
| Sodium Carboxymethyl Cellulose | 0.75 | 0.5–3 |
| Water | 30.5 | 15–60 |
| Water miscible solvents | 69 | 40–75 |
| Wetting agent | 0.1 | 0.0–0.2 |

Medium viscosity carboxy methyl cellulose marketed by The Hercules Powder Company gives excellent results. The water miscible solvents preferably comprise approximately equal parts of methanol and ethyl alcohol, but the proportions of these solvents may be varied from 100% methanol and no ethyl alcohol to 100% ethyl alcohol and no methanol. Diamyl sodium sulfosuccinate may be employed as the wetting agent. It is to be noted that by employing butyl Cellosolve in the release layer coating solution, it becomes unnecessary to utilize a subbing layer between the temporary support and the release layer; the butyl Cellosolve attacks the polystyrene base sufficiently to insure proper adhesion between the base 10 and the release layer 11.

The membrane 12 is provided by coating the dried release layer with the following solution.

|  | Parts by weight | |
|---|---|---|
|  | Preferred | Range |
| Nitrocellulose (SS½°) | 9 | 6-20 |
| Polyvinyl Butyraldehyde | 4.5 | 2-10 |
| Dibutyl Phthalate | 4.5 | 0-30 |
| Ethyl Acetate | 12.5 | 5-25 |
| Isopropyl Alcohol | 15 | 5-20 |
| Butyl Alcohol | 5 | 2-10 |
| Toluol | 12.5 | 5-25 |
| Ethyl Alcohol | 55 | 25-75 |

The polyvinyl butyraldehyde adds toughness to the membrane and gives it, along with the plasticizer, the required flexibility and toughness for easy handling. "Butvar" polyvinyl butyraldehyde manufactured by Shawinigan Products Corporation gives excellent results. It is to be noted that the carboxy methylcellulose release layer protects the polystyrene base from the solvents that are used to make the membrane solution. The solvents otherwise would readily attack the polystyrene base.

The subbing layer for the membrane is provided by coating the dried membrane with the following solution.

|  | Parts by weight | |
|---|---|---|
|  | Preferred | Range |
| Gelatine | 3 | .5-4 |
| Water | 2 | .5-5 |
| Glacial Acetic Acid | 6 | 1-8 |
| Nitrocellulose (SS½°) | 8 | .5-10 |
| Acetone | 18 | 5-25 |
| Methanol | 63 | 25-75 |

After the subbing layer has dried, a conventional emulsion may be applied, thus completing the film. The subbing layer effectively bonds the emulsion to the membrane. The release layer secures the membrane to the temporary support firmly enough to prevent accidental dislodgement or floating away of the membrane during processing, and furthermore protects the temporary support from the solvents for the membrane.

As noted above, other base materials may be employed as a temporary support. If the temporary support is composed of vinyl sheeting, pigmented as before, the release layer given above is preferably employed, but the vinyl film base is preferably first provided with a substratum by coating it with the following solution:

|  | Parts by weight | |
|---|---|---|
|  | Preferred | Range |
| Gelatin | 5.0 | 3.5-7 |
| Water | 14.5 | 10-18 |
| Glacial Acetic Acid | 4.0 | 2.5-5.5 |
| Nitrocellulose (R.S.½°) | 17 | 14-20 |
| Dibutylphthalate | 7.0 | 5-9 |
| Methanol | 165.0 | 150-180 |

When a pigmented acetate film base is employed, the same release layer is preferred, but the acetate base is preferably first coated with the following subbing material:

|  | Parts by weight | |
|---|---|---|
|  | Preferred | Range |
| Gelatin | 1.4 | 1.2-1.6 |
| Formic Acid | 5.15 | 4.75-5.65 |
| Methylene Chloride | 50 | 40-60 |
| Acetone | 30 | 25-35 |
| Isopropyl Alcohol | 25 | 20-30 |

In all of the above cases, the membrane, subbing layer on the membrane and emulsion can be as previously described. Also, substrata conventionally employed on vinyl and acetate films can be employed with the same release layer; for example, commercially subbed vinyl and acetate film base materials can be employed, provided that the plastic is pigmented or dyed so that it has the desired light absorption qualities.

In all cases, the coatings may be applied by conventional methods such as reverse roll coating, nip coating, dipping and air knife coating. All of the coatings except the emulsion may be sprayed if desired. Each coating is dried before the subsequent coating is applied.

Since properly pigmented or colored film base costs only very slightly more than the same material in the clear state, it will be evident that the stripping film of the present invention can be manufactured at lower cost than conventional stripping films because of the elimination of the subbing and anti-halation layers that are conventionally employed on the back of the temporary support. In addition, in many cases it has been necessary to employ a subbing layer between the temporary support and the release layer and such subbing layer is also eliminated by the present invention when polystyrene film base is employed.

The present invention not only provides an important saving in manufacturing cost, but also gives important and unexpected advantages in use. Thus, the stripping film is used in the same manner as conventional stripping film, but because of the fact that the base material is translucent rather than transparent, it is possible for the operator to inspect the exposed stripping film during development or processing by reflected light as well as transmitted light. With conventional stripping films, inspection by transmitted light only is possible; with paper-backed stripping films inspection by reflected light only is possible.

For reasons that are not entirely clear but probably related to the bouncing of light from the temporary support back into the emulsion during exposure, I have found that a given emulsion is about 50% faster when used in a stripping film embodying the present invention with a pigmented translucent temporary support than the same emulsion when incorporated in a conventional stripping film embodying a transparent support and a separate anti-halation coating. The bounce-back increases the speed of the emulsion without detracting from the contrast and definition obtainable by the emulsion, and because of the anti-halation material is very close to the emulsion, being separated from it only by the very thin release layer and the very thin membrane, no substantial loss of definition results from the bounce back. This unexpected increase in speed is of great benefit to photo-engravers and other users of the film.

Another important advantage is that the orange colored temporary support, after the membrane and emulsion have been stripped from it, provides an ideal material for masking in layout and makeup work by photo-engravers. Ordinarily, photo-engravers purchase orange colored paper for this purpose. The plastic orange colored temporary support is superior to the paper for masking purposes and results in an additional saving to the photo-engraver.

Those skilled in the art will appreciate that various changes and modifications can be made in the preferred forms of the invention disclosed herein without departing from the spirit and scope of the invention. The essential characteristics of the invention are defined in the appended claims.

I claim:

1. A photographic stripping film comprising a temporary support consisting of a translucent polystyrene plastic film base material incorporating an anti-halation pigment, a release layer consisting essentially of carboxymethyl cellulose coated on the temporary support, a membrane constituting a permanent support releasably secured to the temporary support by the release layer and a photo-sensitive silver halide emulsion permanently carried by the membrane.

2. A photographic stripping film comprising a translucent pigmented polystyrene plastic film incorporating an anti-halation pigment therein, a release layer consisting essentially of carboxymethyl cellulose adhering to the temporary support, a membrane consisting essentially of nitrocellulose and polyvinyl butyraldehyde releasably secured to the temporary support by the release layer, a substratum on the membrane and a photo-sensitive silver halide emulsion secured to the membrane by the substratum.

3. A photographic stripping film comprising a temporary support composed of translucent polystyrene film incorporating an anti-halation pigment and having a thickness of about .005 inch, a release layer consisting essentially of carboxymethyl cellulose adhering to the temporary support, a membrane consisting essentially of nitrocellulose and polyvinyl butraldehyde releasably secured to the temporary support by the release layer, a substratum on the membrane and a photo-sensitive silver halide emulsion secured to the membrane by the substratum.

4. A photographic stripping film consisting essentially of a temporary support composed of a translucent plastic vinyl film incorporating an anti-halation pigment, a substratum on the temporary support, a release layer consisting essentially of carboxymethyl cellulose on said substratum, a membrane consisting essentially of nitrocellulose and polyvinyl butyraldehyde releasably secured to the temporary support by the release layer, and a photo-sensitive silver halide emulsion on the membrane on the side thereof opposite the temporary support.

5. The method of making photographic stripping film which includes the steps of coating a translucent polystyrene base material incorporating an anti-halation pigment therein directly with the following solution without the intervention of any subbing layer:

| | Parts by weight |
|---|---|
| Butyl Cellosolve | 2–15 |
| Sodium carboxymethyl cellulose | 0.5–3 |
| Water | 15–60 |
| Water miscible solvents | 40–75 |
| Wetting agent | 0.0–0.2 | drying said coating to provide a release layer, forming a membrane constituting a permanent support on the surface of the release layer and applying a photo-sensitive silver-halide emulsion to the membrane.

References Cited in the file of this patent
UNITED STATES PATENTS

| | | |
|---|---|---|
| 1,305,195 | Cocanari | May 27, 1919 |
| 2,363,764 | White | Nov. 28, 1944 |
| 2,650,877 | Boyer | Sept. 1, 1953 |
| 2,650,878 | Boyer | Sept. 1, 1953 |
| 2,887,379 | Blake et al. | May 19, 1959 |
| 2,963,366 | Kosar et al. | Dec. 6, 1960 |
| 3,010,838 | Uber | Nov. 28, 1961 |